Dec. 24, 1968   A. VEIT   3,418,048
OPTICAL APPARATUS FOR PHOTOGRAPHIC PRINTING
Filed Nov. 9, 1965   2 Sheets-Sheet 1

Inventor:
Anton Veit
by Michael J. Striker

United States Patent Office 3,418,048
Patented Dec. 24, 1968

3,418,048
OPTICAL APPARATUS FOR PHOTOGRAPHIC PRINTING
Anton Veit, 7 Gozbertstrasse, Munich 9, Germany
Filed Nov. 9, 1965, Ser. No. 506,947
Claims priority, application Germany, Nov. 10, 1964,
V 27,122
10 Claims. (Cl. 355—38)

ABSTRACT OF THE DISCLOSURE

An optical filter assembly with three filter arrays, each array comprising a plurality of mutually parallel wedge-shaped filter elements of a common primary color, e.g. yellow, cyan and magenta. The elements of each array are directed to a center and marginal elements of each said array are overlapping with marginal elements of respective adjacent arrays. Said optical filter assembly may be used in an optical projection apparatus for the photographic printing or enlargement of transparent color originals.

---

The invention concerns colour filter assemblies and a method and an apparatus for the photographic printing or enlargement of transparent color originals in which such filter assemblies may be used with better results than the hitherto used filters. The invention provides an improved color filter element, but relates more particularly to a device including a set of two color filter elements, each comprising a transparent disc carrying, at positions mutually displaced by 120°, progressive filter elements for three selected primary colors, together with a device for the adjustment of these filter discs.

A known arrangement for providing continuously adjustable color filtering in the printing of color photographs consists in introducing a color filter of medium density to a greater or less extent into the optical path of the printing light, and in equalizing the non-uniform illumination of the print which thus results by means of a compensating disc of appropriately varying density. This device has the disadvantage that color filters of very high color density cannot be employed, since otherwise, despite the use of the compensating disc, a locally non-uniform coloration of the printing light results. With very high enlargements, also even the use of a filter of medium density may result in non-uniform illumination of the picture field.

It is also known to compensate alterations of the effective filter density resulting from adjustment of the filter by corresponding but opposite adjustment of a diaphragm. This arrangement employs filters of continuously variable density, which are expensive.

It is additionally known to make color prints by three partial exposures, and to control the duration of the individual partial exposures by slits in a control tape. In practice this arrangement is used only for the production of very numerous copies from each particular original, since a control tape with slits of appropriate length must be provided for each original.

It is also known to obtain a continuously adjustable filter by using a movable filter with filter material cut into a comb-like array of wedge-shaped elements, and a matching comb-like segment which remains in the optical path. The color density of such a filter may be continuously varied from approximately zero up to the maximum color density. The disadvantage of this arrangement is that six color filter discs are present in the optical path at the same time and that much light is therefore lost.

The invention concerns especially a filter assembly in which the disadvantages stated above are avoided, as well a method of photographic printing and an apparatus for practicing such method in which such a filter assembly may be used with advantage.

A filter assembly in accordance with the present invention comprises a filter assembly comprising a plurality of comb-like arrays of mutually parallel wedge-shaped color filter elements, said arrays being differently angularly directed with respect to a common center, the elements of each array in part overlapping those of adjacent arrays and the lengths of the elements being so chosen that the area surrounding said center is colorless.

The invention also provides a method of photographic color printing in which length passing from a colored original to photographically sensitive material is passed through a set of two filter assemblies in accordance with the invention, each said assembly comprising a set of filter elements of the three subtractive primary colors and each assembly being adjustable both by rotation about its own axis and by radial displacement with respect to the optical path.

This arrangement overcomes certain difficulties of known apparatus and permits uniform continuous variation of the color density for all spectral colors from zero to the three subtractive colors. Preferably the pair of filter discs is arranged at that position at which the optical path is at its narrowest, between two filed lenses, so that the diameters of the two filter assemblies may be kept as small as possible.

These filter discs may be used with advantage in a method for the printing or enlargement of transparent color originals, in which the light from the printing light source after passing through the color original is divided into three portions, which are passed respectively through blue, green and red blocking filters to respective light-sensitive indicator devices, which are so set up that all the indicators show the same values at color balance. The beam-splitter device is now removed from the optical path and finally the exposure is effected by way of the filter assembly previously adjusted for color equalisation.

The novel features which are considered as characteristic for the invention are set forth in particular in the appended claims. The invention itself, however, both as to its construction and its method of operation together with additional objects and advantages thereof, will be best understood from the following description of specific embodiments, describing a filter assembly according to the invention and a photographic printing apparatus making use of such a filter assembly. In the drawings all elements not essential to the understanding of the invention have been omitted, and corresponding parts appearing in more than one figure are denoted by like reference characters in all the figures. The drawings comprise FIGURES 1 to 4, of which:

FIGURE 1 shows the essential parts of one embodiment of apparatus for carrying out a method of photographic printing in accordance with the invention, FIGURE 2 illustrates a filter assembly in accordance with the invention, FIGURE 3 shows the positions of two filter assemblies used in the apparatus of FIGURE 1 when adjusted for maximum color density of one chosen color, FIGURE 4 shows the positions of the two filter discs of FIGURE 1 when adjusted for so-called zero filtering.

The printing apparatus illustrated schematically by FIGURE 1 consists essentially of a light source A, a filter assembly B, the filters of which are adjustable by means of an orbital mechanism, a device C for receiving the cole red original, a hinged test assembly D with an associated indicator device E and the so-called easel F on which the photographically sensitive printing material is placed, together with the necessary lenses and filters.

The incandescent filament 1 of the printing lamp serves both for measurement and also for the exposure. In the optical path there are disposed a heat filter 2 and two field lenses 3 and 9, between which the filter assembly B is arranged in the vicinity of the narrowest section of the optical path. The handle 4 serves to adjust the color density of a correcting filter combination of which the color is adjustable by means of an adjusting ring 5. By means of an orbital mechanism later described the adjusting ring controls the position of two color filter discs 6, 7 which are arranged to gyrate about the optical axis without rotation about their own axes, thus introducing each peripheral portion in turn of the filter discs into the optical path to vary the filter color.

The filter disc 6 which is uppermost in FIGURE 1 carriers three comb-like arrays of wedge-shaped color filter elements, as shown in FIGURE 2. The three arrays are mutually displaced by 120° and each in part overlaps the two adjacent arrays. The lower filter disc 7 is identical with the upper disc 6 but is rotated about its own axis by 180°. A compensating disc 8 is positioned in front of the transparent color original 10, behind the objective lens 11 of the enlarger device.

The test device D, which can be hinged into the optical path when required, contains an upper field lens 12, a deflecting mirror 13 and a further field lens 12a. A partially-transparent mirror 15, arranged to transmit two-thirds of the incident light, deflects one-third of the light by way of a further deflecting mirror 14 and a blue blocking filter 17 on to a photocell 20. A semi-transparent mirror 16 deflects half of the light passed by mirror 15 through a green blocking filter 19 on to a photocell 22 and the other half of the light passes through mirror 16 and through a red blocking filter 18 on to a photocell 21.

During measurement the light from the beam-splitter falling upon the three photocells is there converted into electric currents of corresponding magnitude, which produce appropriate readings on three indicating meters 26, 27 and 28. Adjusting knobs 23, 24 and 25 vary the individual sensitivities off the three measuring circuits in accordance with the characteristics of the printing material. Knob 29 serves to adjust the sensitivity of all three measuring amplifiers so as to compensate for the density of the color original.

FIGURE 1 also shows the mechanism for adjusting the color density of the filter assembly. Filter disc 6 is supported by a frame pivoted at 33, 33' to nuts 31, 31' which in turn are carried on respective screw-threaded spindles 35, 35' mounted for rotation parallel to the planes of respective spur gears 37', 38'. Gears 37', 38' are mounted for axial rotation upon a hollow casing which surrounds the assembly and is axially apertured to allow the passage of light. Filter disc 7 is similarly carried by a frame pivoted at 34, 34' to nuts 32, 32' working on threaded spindles 36, 36' mounted for rotation parallel to the planes of respective gears 37, 38. Gears 37, 38 are also mounted for axial rotation upon the hollow casing of the assembly. The teeth formed on the edges of a double annular member coaxially rotatable within the casing of the assembly and meeting peripherally to form a control disc 5 projecting through the casing.

Movement of disc 5 thus causes all the gears to rotate about their own axes, thus moving the centers of filter discs 6, 7 in orbital paths about the optical axis, so that each filter color in turn of the two discs is introduced into the optical path. Movement of disc 5 thus controls the effective hue of the filter. The threaded spindles 35, 35', 36, 36' are rotated by pinions which are engaged by contrate teeth formed on combined spur and contrate gears 41', 42', 41, 42 which are mounted for rotation coaxially with spur gears 37', 38', 37 and 38 respectively. Thus spur teeth of combined gears 41', 42', 41, 42 are driven by a double annular member internally toothed to engage the gears and operated by an outwardly projecting handle 4. Movement of handle 4 causes rotation of combined gears 41', 42', 41 and 42 and thus causes the four nuts 32, 32' to travel simultaneously and equally along their respective spindles 36, 36', thus moving the two filter discs 6, 7 equally towards or away from the optical axis. The color density of the selected hue is thus controlled.

The adjustment of the selected color combination and or of the filter density may be effected from two control knobs either by means of ball-chain or by means of Bowden cable.

The filter assembly according to the invention described about has the advantage that its construction is very flat so that it may be included in existing enlarging or printing apparatus as well as in slide projectors.

In the adjustment of the correcting filter for transparent color originals the procedure is as follows:

(1) The three adjusting knobs 23, 24, 25 are adjusted to the appropriate filter densities in accordance with the information as to the color sensitivity of the printing material given on its packing, or found empirically.

(2) The transparent color original 10 is inserted in the printer or enlarger.

(3) The light source 1 is switched on and the test unit with the upper field lens 12 is brought in front of the lens 11 of the printer or enlarger.

(4) The different indications of the indicating meters 26, 27 and 28 are equalized by movement of the adjusting ring 5 so that the readings of two of the meters are the same. Since at all times only two of the three correcting filters move within the optical path, only two of the meters will show varying readings at any time. The third meter, however, shows only the component of the relevant color in the transparent color original. Thus as the color filter discs make a rotation in the optical path, only these meters associated with the color combination which is situated in the optical path will move.

(5) The two meters which have been adjusted to equality are now simultaneously adjusted, by means of the adjusting handle 4, which increases or decreases the color density of the color combination selected by rotation of the adjusting ring 5, until these meters show the same reading as the third meter. When all three meters show the same reading, the proper color balance for the printing material in use and for the existing condition of the light source (which varies as a result of ageing) has been found. The test apparatus is then hinged aside, so that the filtered light may fall on the printing material.

(6) The actual exposure is then effected with the filters in the position thus adjusted.

FIGURE 2 shows a plan view of one of the two filter discs. The upper segment shows a comb-like array of aligned wedge-shaped yellow filter elements; displaced with respect to this first array by an angle of 120° is a similar array of magenta filter elements; and displaced by a further 120° another similar array of cyan filter elements. Between the simple one-colored portions the crossing arrays yielding the combinations yellow-magenta, magenta-cyan and cyan-yellow. The wedge-shaped comb elements arrange that the color in the vicinity of the center of the filter disc is much less dense and becomes progressively more dense towards the circumference. The actual center of the disc is colorless.

It will be seen that the apices of the filter wedges lie on lines mutually inclined at 120°, so that the central colorless area of the filter disc is a regular hexagon.

Figure 1:
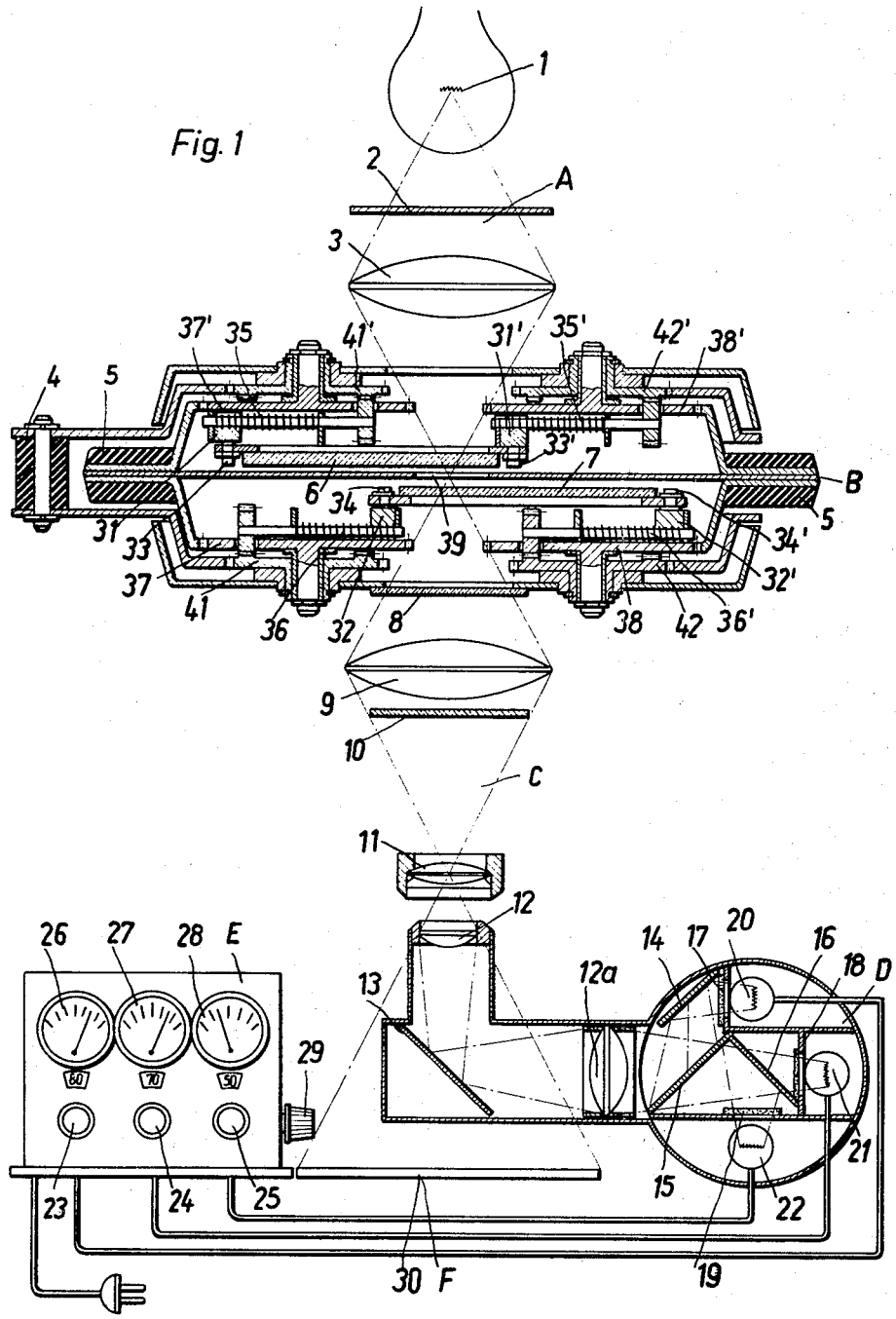
Figure 2:
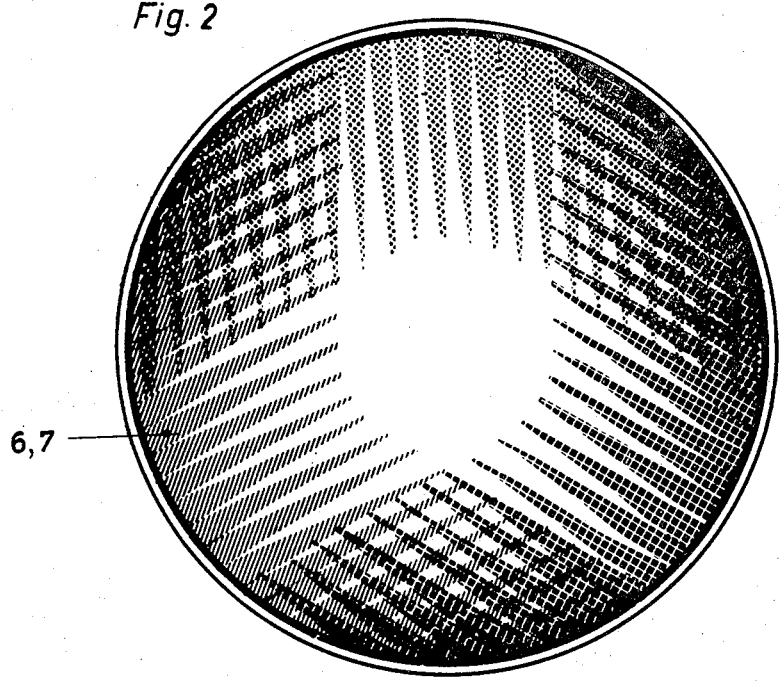
Figure 3:
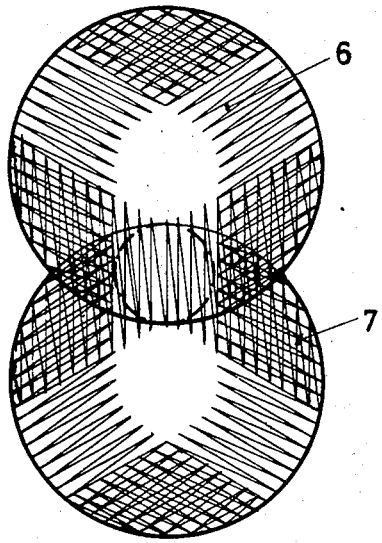
FIGURE 3 shows the relative position of the two-color disc when it is required to obtain the greatest color density for a selected one of the colors.
Figure 4:
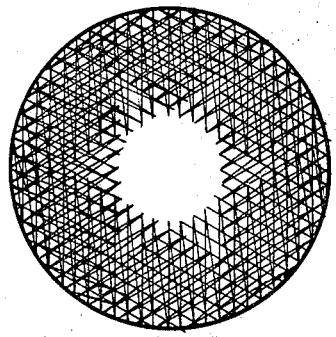
FIGURE 4 shows the two filter discs exactly superimposed, so that the optical path passes through the central, colorless portion of the discs and no filtering action is effected.

While the invention has been illustrated and described as embodied in specific arrangements it is not intended to be limited to the details shown, since various modifications and structural changes may be made without departing in any way from the spirit of the present invention.

What is claimed and desired to be secured by Letters Patent is:

1. An optical filter assembly including first, second and third filter arrays, each said array comprising a plurality of mutually parallel wedge-shaped filter elements of a common color differing from that of elements of each other said array, the elements of each said array being directed at an individual angle with respect to a center common to all said arrays, and marginal elements of each said array overlapping with marginal elements of respective adjacent arrays.

2. An optical filter as claimed in claim 1 wherein the colors of said arrays are primary colors.

3. An optical filter as claimed in claim 1 wherein the colors of said filter arrays are the subtractive primary colors yellow, cyan and magenta.

4. An optical filter as claimed in claim 1 wherein said filter arrays are directed at mutual angles of 120° to the center of a transparent disc supporting said arrays.

5. Optical projection apparatus including a receptacle for a colored transparency, means including a light source for illuminating said transparency, an image-receiving surface, optical means including an optical path having an optical axis for imaging said transparency on said surface, and filter means in said optical path, said filter means comprising first and second filter discs diametrally opposed with respect to said axis and each intersecting said optical path, first adjusting means operable simultaneously to displace said filter discs orbitally about said axis without rotation and second adjusting means operable simultaneously and similarly to displace said filter discs radially of said axis, each said filter disc comprising a transparent substrate supporting first, second and third arrays of mutually parallel wedge-shaped filter elements, the elements of said arrays being directed at mutual angles of 120° with respect to the center of said disc and the elements of each said array being of an individual subtractive primary color.

6. Optical projection apparatus as claimed in claim 5 wherein said first adjusting means comprises: first and second frames supporting said first and second filter discs respectively; a centrally apertured support member surrounding said optical path; first and second and third and fourth control members, said first and second control members being mounted for rotation about respective first and second axes coplanar with and equally and oppositely spaced from said optical axis, and said third and fourth control members being mounted for rotation about said first and second axes respectively; pivot means connecting diametrally opposite points on said first frame to respective points on said first and second control members equally radially spaced from said first and second axes; and further pivot means connecting diametrally opposed points on said second frame to respective points on said third and fourth members equally radially spaced from said first and second axes; whereby simultaneous rotation of said first and second and of said third and fourth control members produces orbital movement of said first and of said second filter discs about said optical axis.

7. Optical projection apparatus as defined in claim 6, wherein said control members are spur gears and including a double internally toothed annular member drivingly engaging all said spur gears to produce diametrally opposed orbital movements of said first and second filter discs about said optical axis.

8. Optical projection apparatus as defined in claim 5 and including drive means operable to produce simultaneous adjustment of the radial positions of said pivots with respect to said respective first and second axes, whereby the effective color density of said filter may be varied.

9. Optical projection apparatus as defined in claim 8 wherein said drive means includes respective first, second, third and fourth threaded spindles, each mounted on the respective first, second, third or fourth control member for rotation about a spindle axis perpendicular to and intersecting said respective first or second axis; respective nut means threadedly engaging each said spindle, each said nut means including a said pivot means; first, second, third and fourth further control members mounted respectively for rotation coaxially with said first, second, third and fourth control members; drive means connecting said spindles for rotation in response to rotation of the respective further control member; and a drive member coupled with said further control members to produce simultaneous rotation thereof, thereby to produce simultaneous and equal radial displacements of said filter disc with respect to said optical axis.

10. Optical projection apparatus as defined in claim 9 wherein said further control members are compound gears having spur-gear portions and contrate-gear portions; and wherein said drive member is a double internally-toothed annular member drivingly engaging said spur-gear portions of said further control members; and wherein said threaded spindles include pinion means drivingly engaged by said contrate-gear portions of said compound gears.

References Cited

UNITED STATES PATENTS

| | | | |
|---|---|---|---|
| 3,077,140 | 2/1963 | Simmon et al. | 88—24 |
| 3,083,614 | 4/1963 | Veit | 88—24 |
| 3,292,488 | 12/1966 | Griffith | 88—24 |

NORTON ANSHER, *Primary Examiner.*

R. A. WINTERCORN, *Assistant Examiner.*

U.S. Cl. X.R.

350—311, 315, 316